United States Patent [19]

Seol

[11] Patent Number: 5,405,096

[45] Date of Patent: Apr. 11, 1995

[54] MULTIPURPOSE PULVERIZER

[76] Inventor: Yong-seok Seol, 525-12, SSangmun 1-dong, Dobung-ku, Seoul, Rep. of Korea

[21] Appl. No.: 176,101

[22] Filed: Dec. 30, 1993

[30] Foreign Application Priority Data

Jan. 16, 1993 [KR] Rep. of Korea .................. 93-561
Jan. 16, 1993 [KR] Rep. of Korea .................. 93-562

[51] Int. Cl.⁶ .............................................. A23N 1/02
[52] U.S. Cl. .................................... 241/282.1; 99/511
[58] Field of Search ............... 241/282.1, 101.1, 101.2; 99/485, 501, 503, 511–513

[56] References Cited

U.S. PATENT DOCUMENTS 2,481,010  9/1949  Gundelfinger .................... 99/512
3,924,838  12/1975 Waniishi et al. ................... 99/511
4,183,293  1/1980  Arao et al. ........................ 99/513
4,688,478  8/1987  Williams ......................... 241/282.1
5,222,430  6/1993  Wang ............................ 241/282.1

Primary Examiner—Douglas D. Watts
Attorney, Agent, or Firm—Anthony J. Casella; Gerald E. Hespos

[57] ABSTRACT

This invention is related to a multipurpose pulverizer which has the functions of pulverizing, cutting, juicing and centrifugal-dividing foods simultaneously. Therefore this pulverizer can be applied to grind the dried beans for the bean flour, it can be applied to cut the foods for cutting or mincing them, and it can be applied to juice, centrifugal-divide the fruits and vegetables. The safety device is installed inside the handle to be adjusted in accordance with the height by pressing the switch with the cover protrusion with the function of the juicer.

5 Claims, 7 Drawing Sheets

MULTIPURPOSE PULVERIZER

BACKGROUND OF THE INVENTION

1. Field of the Invention

This invention is related to a multipurpose pulverizer which has the functions of pulverizing, cutting, juicing and centrifugal-dividing foods simultaneously.

For examples, this pulverizer can be applied to grind the dried beans for bean flour, it can be applied to cut or mince foods, and it can be applied to juice or centrifugal-divide fruits and vegetables.

2. Description of the Prior Art

There were known various kinds of mixers, grinders, cutters and juicers, however, these have not satisfied the customer because of their single function. Sometimes combined usage of mixer and pulverizer can be found, but these have not fully satisfied the customers. There were no safety devices for the customer in such machines, and this often causes troubles and danger.

This invention is provided to solve the defects and to perform multi-functions effectively, for examples, to centrifugal-divide juicy foods.

BRIEF SUMMARY OF THE INVENTION

It is an object of the invention to provide an improved multipurpose pulverizer which can be applied to pulverize, cut, juice and centrifugal-divide foods.

Another object of the invention is to provide a multipurpose pulverizer whose structure can process the foods in accordance with the kinds of the foods with changing the cutter, blades, rotating juicer case or centrifugal-divide juicer case.

An additional object of the invention is to provide a centrifugal-dividing function of juicing fruits or vegetables with particular centrifugal juicer devices of the pulverizer.

An even further object of the invention is to provide a press bar with a length that can be adjusted according to the depth of the pulverizer.

BRIEF DESCRIPTION OF THE DRAWINGS

The objects and advantages of the invention will become apparent during the following description of the accompanying drawings, wherein.

DETAILED DESCRIPTION OF THE INVENTION

Figure 1:
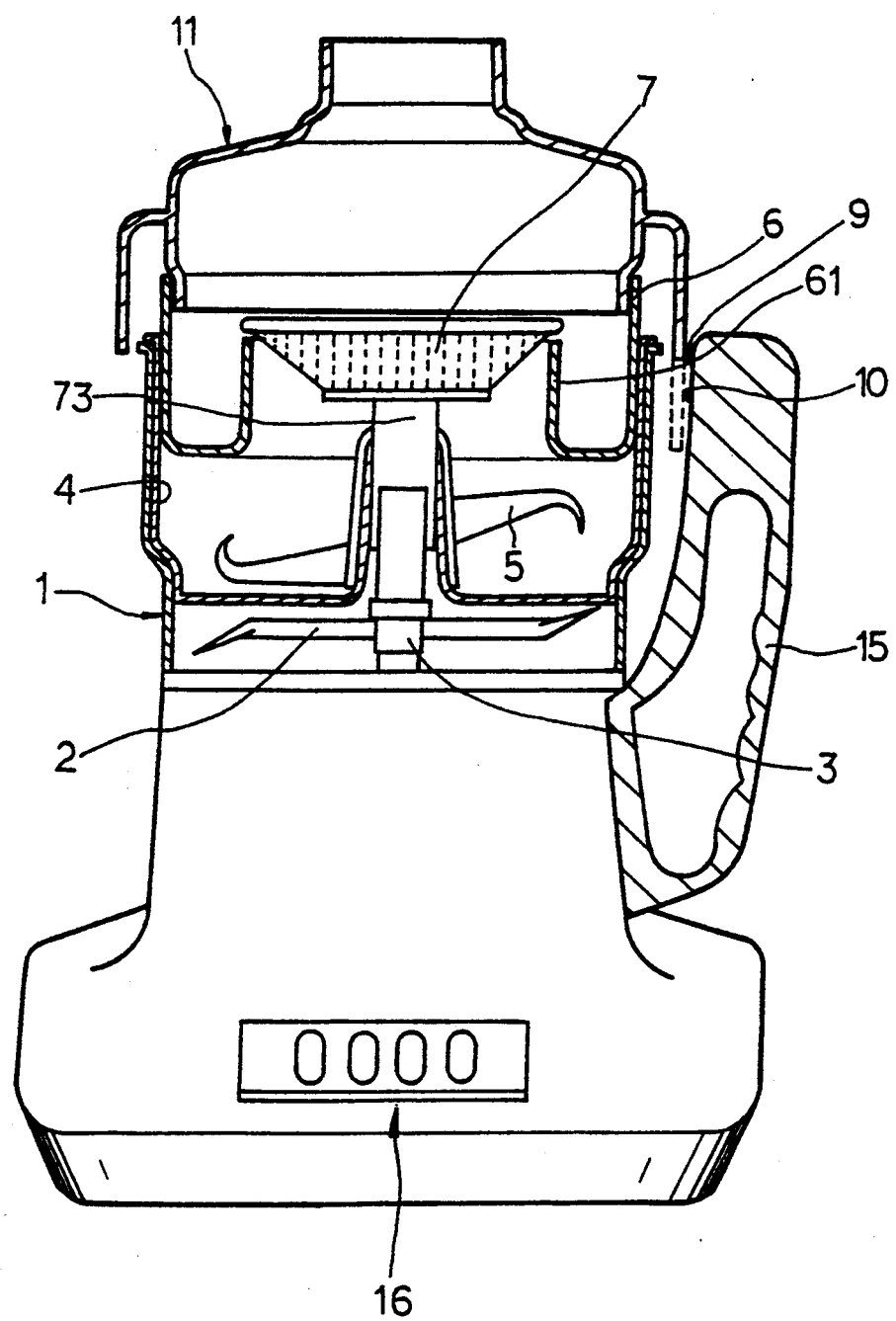
FIG. 1 is a partly sectional schematic illustration of an embodiment of the pulverizer according to the invention.

FIG. 1 is a partly sectional schematic illustration of an embodiment of the pulverizer according to the invention. As shown in the figure, the multi-purpose pulverizer consists of a body(16), an outer case(1), rotatable shaft(3) at the center of the outer case(1) to which the pulverizing blade(2) can be attached, cutter case(4) mounted on the outer case(1), a waste case(6), a rotatable jucer case(7) and a cover(11). There is a protrusion in the center of the cutter case(4) to insert the shaft(3) to attach the cutter blade(5) for mincing meat and chopping garlic or other foods up fine in the cutter case(4) and the waste case(6) to receive the waste after juicing is assembled with rotatable juicer case(7) on the cutter case(4).

The rotatable shaft(3) is connected to the motor(not shown) in the body(16) and rotated by rotation power of the motor, so the cutter blades(5) or pulverizing blades(2) are rotated simultaneously. When the user wants to pulverize the dried foods, only the pulverizing blades(2) are assembled to the rotatable shaft(3) for pulverizing the dried foods. The user puts the dried foods into the outer case(1), closes the cover(11) and pushes the buttons on the body(16) with the protrusion of the cover(11) to rotate the pulverizing blade(2) and to pulverize the dried foods. When the user wants to mince the meat or to chop the garlic, the cutter case(4) is put and fixed into the outer case(1) with grooves on the cases. The cutter blades(5) are inserted into the protrusion in the center of the cutter case (4) to be fixed to the rotatable shaft to rotate in accordance with the rotation of the motor. The user puts the meat or the garlic into the cutter case(4), closes the cover (11) and push the buttons on the body(16) to mince the meat or chop the garlic.

Figure 2:
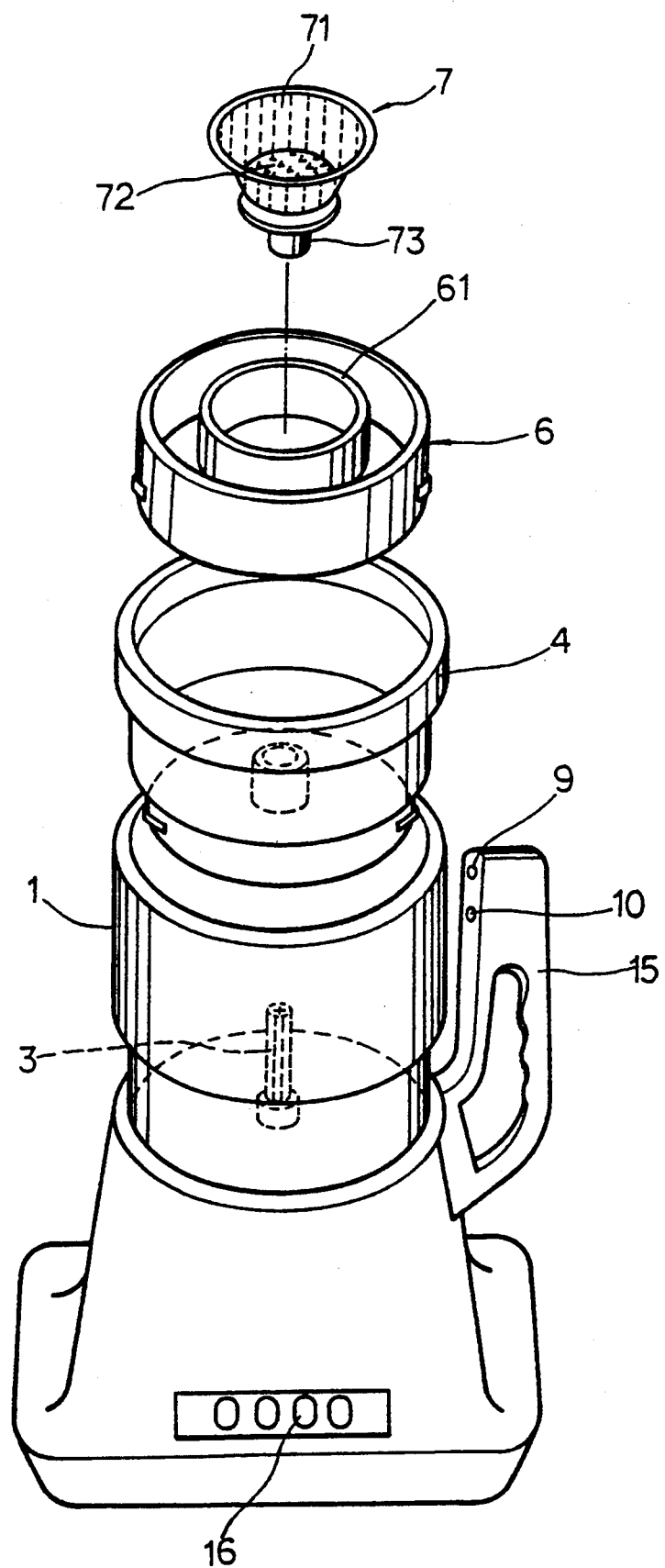
FIG. 2 is an exploded perspective view of another embodiment of combining pulverizer, cutter and juicer according to the invention.

FIG. 2 is an exploded perspective view of another embodiment of combining pulverizer, cutter and juicer according to this invention. As shown in the FIG. 2 a big openning is formed in the waste case(6) inserted into the cutter case(4), and an inner wall(61) is formed at the openning. The rotatable juicer case(7), whose shaft(73) is assembled to the rotatable shaft(3), is installed on the inner wall(61).

The rotatable juicer case(7) is formed like a funnel with many little protrued blades(72) on the bottom and with many tiny holes(71) on the side wall like a network. The shaft(73) of the rotatable juicer case(7) is assembled with the rotatable shaft(3).

When the user puts the fruits or vegetables sliced into the rotatable juicer case(7) and closes the cover(11), the user can press the fruits by press bar(12) through the vertical beak(111) formed in the cover(11) and simultaneously the rotatable juicer case (7) is rotated by the switch on the body(16). Then the object is pulverized well by the the rotation of many little protrued blades and the pressure of the press bar(12), and the juice of the object is gathered in the cutter case(4) through many tiny holes (71). The rest of the object is strained by the rotatable juicer case(7), that is, the waste of the fruits or vegetables is gathered into the waste case(6).

Figure 3:
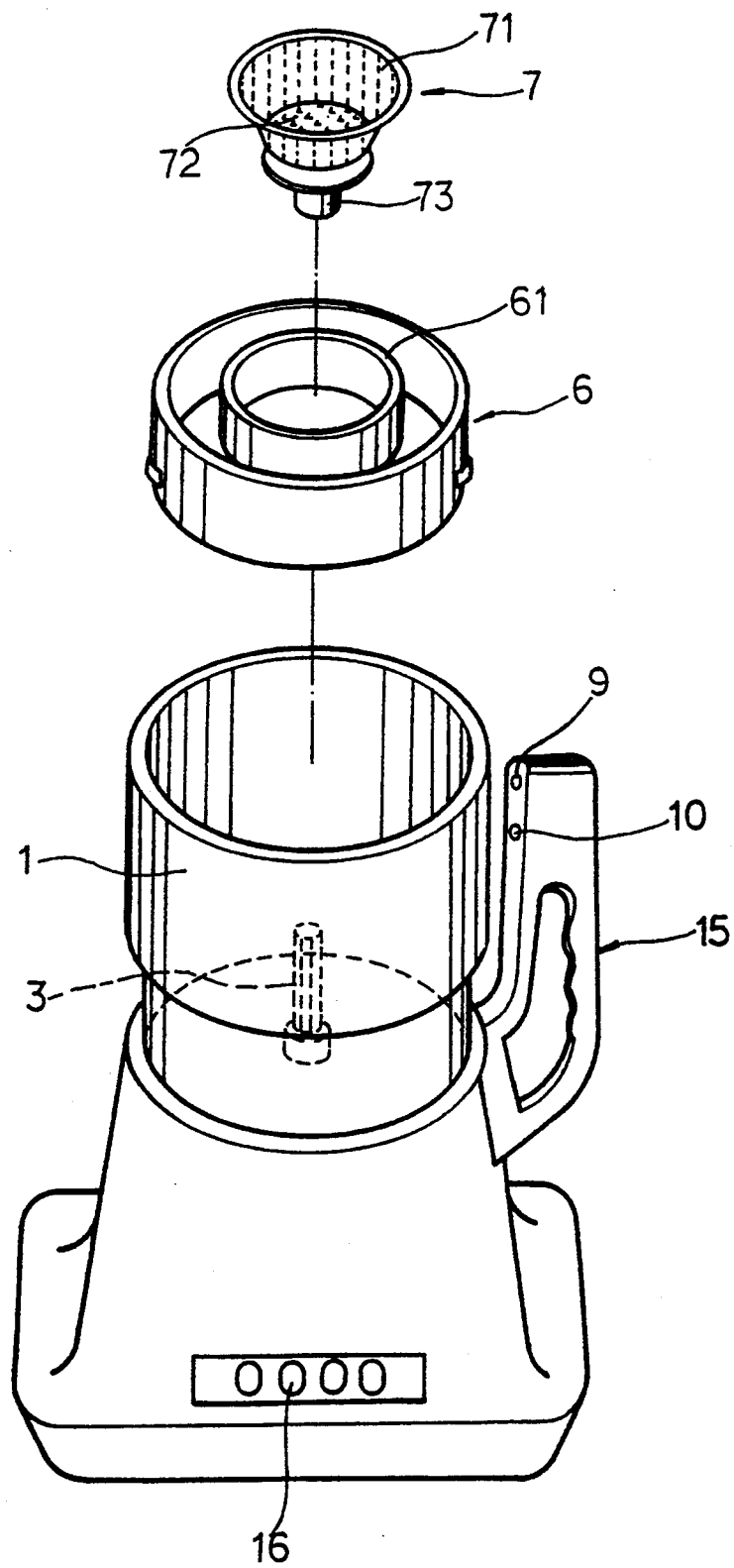
FIG. 3 is an exploded perspective view of the pulverizer of the invention when it works as a juicer.

FIG. 3 is an exploded perspective view of the pulverizer of the invention when it works as a juicer. After inserting the waste case(6) into the outer case(1) of the pulverizer, the waste is gathered in the waste case(6)

and the juice is gathered in the outer case directly by combining the rotatable juicer case(7) with the rotatable shaft(3).

Figure 4:
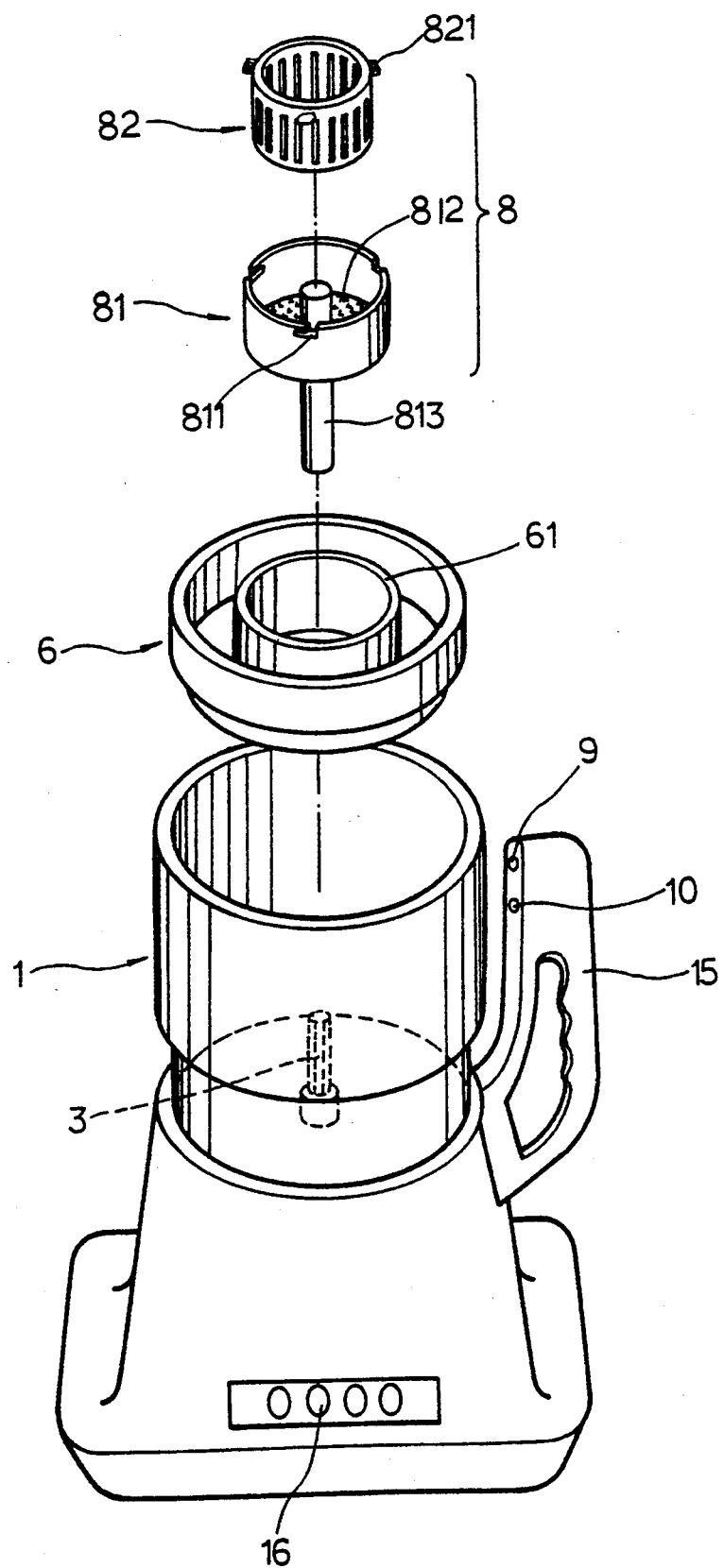
FIG. 4 is an exploded perspective view of an additional embodiment of the multi-purpose pulverizer according to the invention.

FIG. 4 is an exploded perspective view of an additional embodiment of the multi-purpose pulverizer according to the invention. The centrifugal juicer case(8) is combined with the rotatable shaft(3) in the stead of rotatable juicer case(7) in FIGS. 2 and 3.

Figure 5:
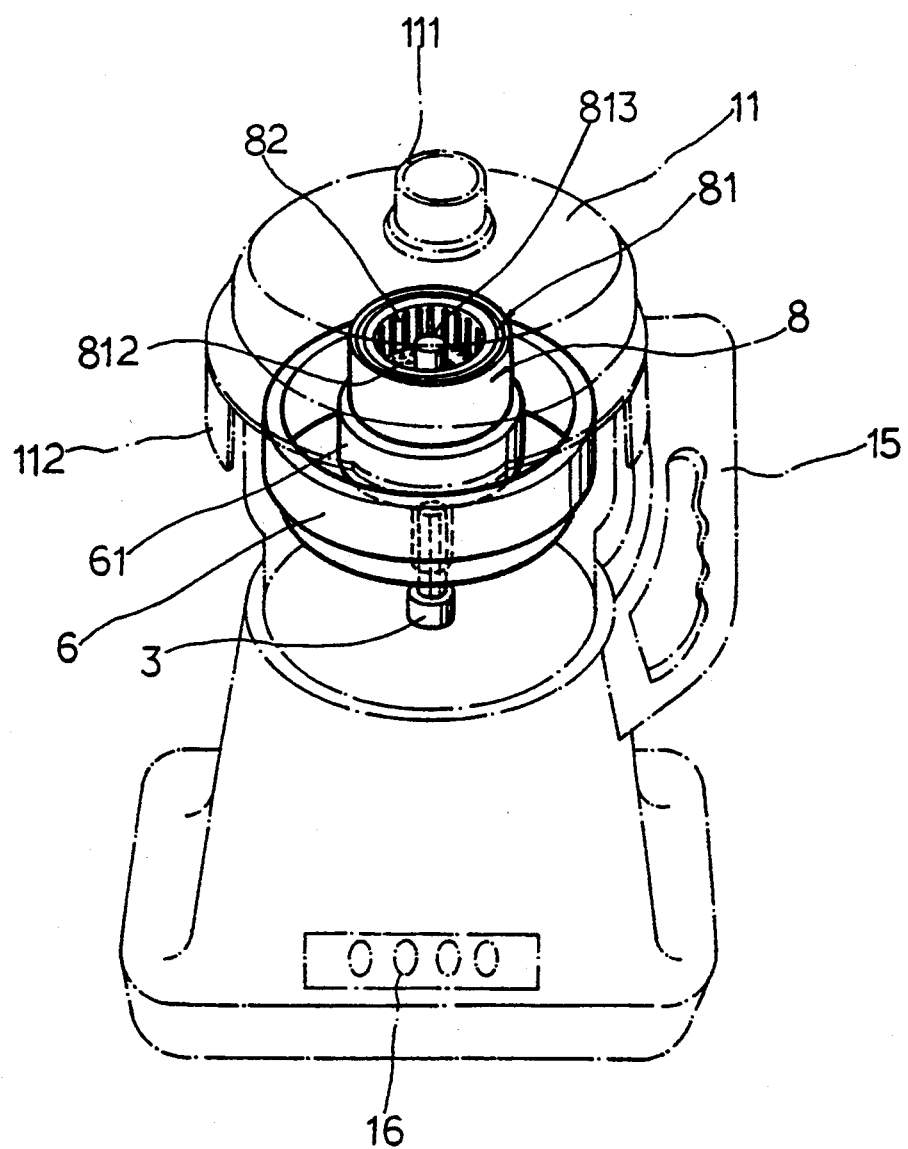
FIG. 5 is an inner perspective view of even further embodiment of the assembled pulverizer according to the invention.

FIG. 5 is an inner perspective view of the assembled pulverizer according to FIG. 4. When the juicy soft food is centrifugal-divided, centrifugal juicer case(8) is used instead of the rotate juicer case(7). The said centrifugal juicer case(8) is divided by a centrifugal post(81) and a centrifugal net(82), which are combined by protrusions(821) and open slits(811). That is, "L" styled open slits are formed on the top of the centrifugal post(81), and protruded blades(32) are formed on its bottom.

The upper part of the centrifugal net(82) has the open slits(811) to be combined with the protrusion(821).

The lower part of the centrifugal post(81) has the shaft(813) to be assembled with the rotatable shaft(3) and the bottom has the protruded blades(812) to be rotated together and pulverize the foods when the set is assembled. In this embodiment, the soft foods are put into the centrifugal net(82) and the cover(l) is closed and the pulverizer is operated by pushing the switch(16). Then the centrifugal juicer case(8) assembled with the rotatable shaft(3) is rotated and juice is made by centrifugal force and the rest of the soft foods without juice is gathered in the waste case(6).

As shown in FIG. 5 the waste case(6) is mounted on the center of outer case(1) to juice fruits and vegetables and has a large openning in the center to mount the centrifugal juicer case(8).

Figure 6:
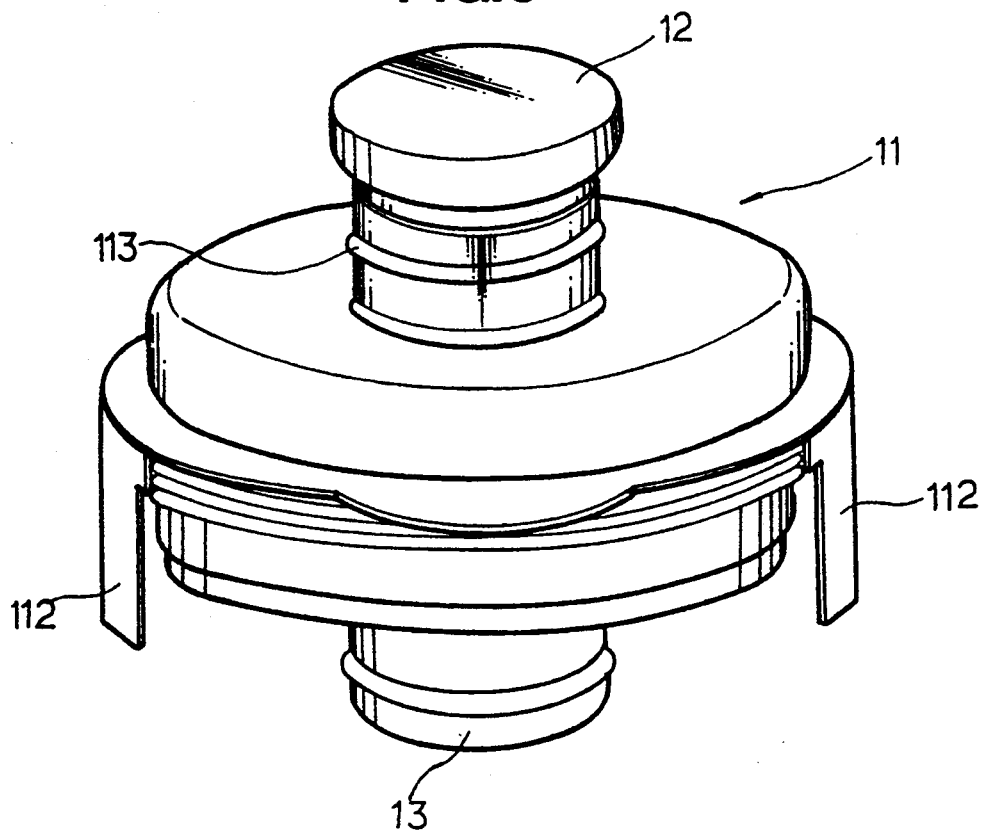
FIG. 6 is a combined perspective view of the cover of main body according to the invention.

As shown in FIG. 6 the cover(11) of this pulverizer has a vertical beak(111) protruded at its bottom to guide the fruits or vegetables directly to the rotatable juicer case(7). There is a height controller(13) to control the length of the beak(111), and the height may be changed in accordance with the selection of the function. Therefore the length of press bar(12) must be changed with the outer guide(14). The press bar(12) and the vertical beak(111) have several steps to change their heights with exchange the combined position of the crumples(121) on their surfaces, and the height of the cover protrusion(112) can press the switch to turn on and off.

The handle(15) of the pulverizer is installed vertically with the safety power switches(9,10) inside the handle with touching by protrusion(112) of the cover(11). The safety power switches(9,10) are turned off if the cover is opened with removing the cover protrusion(112) from the switches. The cases, for example, the cutter case(4a), and the waste case(6) are mounted selectively in accordance with the functions, pulverizing, cutting and juicing foods. The heights of the cases are different, so the height of cover protrusion (112) are also different. Therefore the operating switch is changed according to the cases, which is installed inside the handle(18). The selected switch can work clearly by the cover protrusion(112) and each switch has the different operating voltage to control the speed of the motor.

Figure 7:
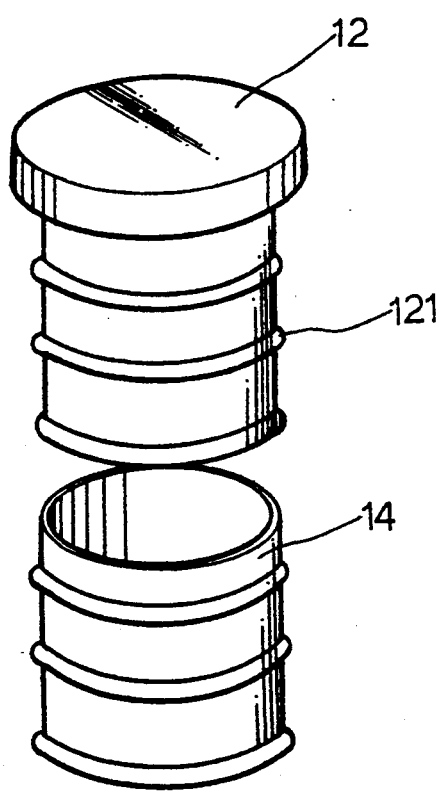
FIG. 7 is an exploded perspective view of combination between the the pressure bar and its outer guide combined with each other in the invention.

As shown in FIG. 7, which is an exploded perspective view of combination between the pressure bar(12) and its outer guide(14), many steps to change the height of the combination are formed on the press bar(12) and outer guide(14). When the height of the cover(11) is changed in accordance with the functions, the outer guide(14) can be inserted and adjusted to put the sliced vegetables and fruits into the rotate juicer case(7) through vertical beak(111) and press the juicer materials to be juiced. Then the juicer materials are held down on the bottom of the rotatable juicer case(7). The combination of the steps of the press bar(12) and protrusion of outer guide(14) is changed to reach the bottom to ensure its complete pressure.

Figure 8:
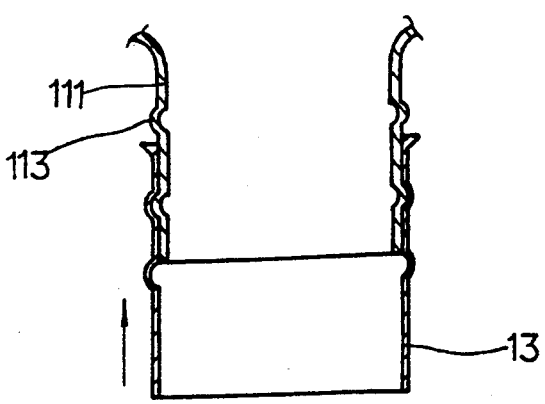
FIG. 8 is a sectional view of assembled height controller inserted into the upper cover.

FIG. 8 shows the sectonal view of assembled height controller inserted into the upper cover. The vertical beak(111) projecting below the cover(11) has the height controller(13) to adjust its height. The height controller(13) and the beak(111) are combined with the stepped protrusions(113) to change its height.

Figure 9:
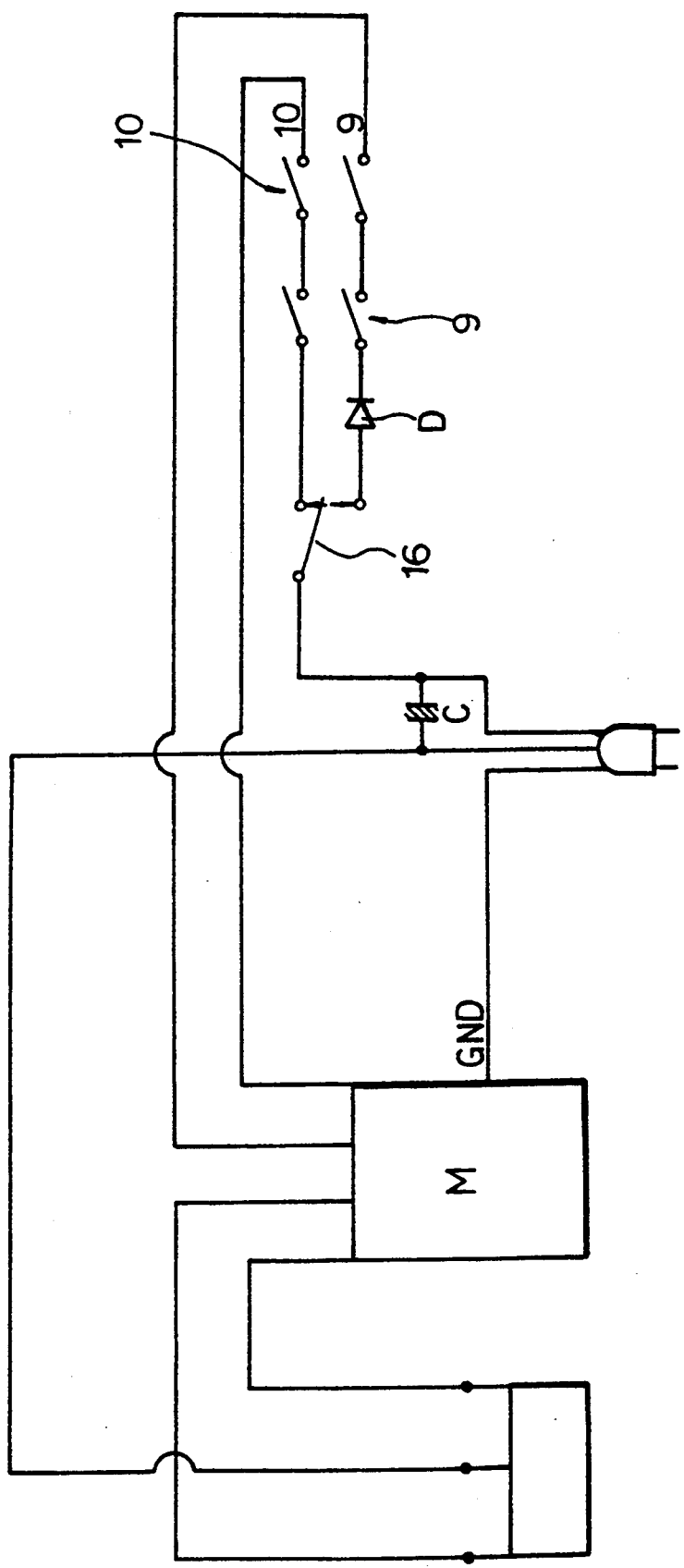
FIG. 9 is a circuit diagram according to the invention.

For the detailed description of the circuit, the relationship between safety switches(9)(10) and button switch(16) will be described in accordance with FIG. 9.

The operation of the circuit shown in FIG. 9, which carries out the functions of pulverizing(high speed), cutting(low speed) and juicing (low speed) in accordance with the contact of the safety power switches(9,10) will be described below.

After transformation of common AC(alternating current) voltage by condenser(C), the voltage will be applied selectively by the safety power switch(10) to control the rotating power. When the customer wants to use it as a pulverizer, according to the selection of the cover(11) which reaches the different height at the cover protrusion(112) the high speed safety power switch(10) is turned on by the micro-switch pressed on. The ground line of power (AC 110/220 V) is connected to the ground terminal of motor (M) and one of power line, and the other power line is connected to the motor(M) through change-over switch, the power line is connected through the button switch(16) to drive the motor(M). The safety power switches(9)(10) are installed inside of the handle(15) to be connected to the appropriate button switch(16) in accordance with the height of the cover protrusion(112).

On the other hand, when the customer uses it as a juicer or cutter, he changes the outer case and tools, for example, the cover protrusion(112) which reaches the different height of the handle(15), the below micro switch is turned on and the customer can use the pulverizer as a juicer or a cutter. For the detailed description of the operation, the current alternative power is applied to the condenser(C) and changed into the appropriate voltage to rotate the motor(M) through button switch and the speed control switch. For the high speed control, a condenser(C) is used to maintain high voltage of 220 V, however for the low speed control, a diode(D) for lowering voltage is used, and the lowered voltage is applied to the motor for low speed rotation.

As described in the above, this invention is related to a multipurpose pulverizer which has the functions of pulverizing, cutting, juicing and centrifugal-dividing foods simultaneously. Therefore this pulverizer can be applied to grind the dried beans for the bean flour, it can be applied to cut the foods for cutting or mincing them, and it can be applied to juice and centrifugal-divide the fruits and vegetables. The safety device is installed inside the handle to be adjusted in accordance with the height by pressing the switch with the cover protrusion with the function of the juicer.

While a preferred embodiment has been described, variations thereto will occur to those skilled in the scope of the present inventive concepts which are delineated by the following claims.

What is claimed is:

1. A multipurpose pulverizer comprising:

a body having an electric motor therein, a rotatable shaft projecting from said body and being rotatably driveable by said motor;

at least one safety power switch projecting from said body and being electrically connected to said motor for selectively permitting and preventing operation of said motor;

an outer case removably mounted to said body and surrounding said rotatable shaft;

a pulverizing blade removably engaged on said rotatable shaft and in proximity to said body;

a cutter case removably mounted in said outer case and surrounding portions of said rotatable shaft, such that said pulverizing blade is intermediate said body and said cutter case;

cutter blades removably mounted to said shaft for rotation therewith and disposed within said cutter case;

a waste case removably mounted in said cutter case, said waste case having a central opening substantially surrounding portions of said rotatable shaft remote from said body;

a rotatable juicer case removably mounted in said central opening of said waste case, said rotatable juicer case further being removably mounted to said rotatable shaft for rotation with said rotatable shaft, said rotatable juicer case having walls with a plurality of holes, portions of said walls adjacent said holes being formed to define a plurality of blades, said holes providing communication between said rotatable juicer case and said cutter case; and a cover releasably engaged with a selected one of said outer case, said cutter case and said waste case and with said safety power switch for permitting operation of said motor only when said cover is engaged with a selected one of said cases.

2. The multipurpose pulverizer of claim 1, further comprising at least one operating switch projecting from said body, said operating switch being manually actuatable for actuating said motor when said cover engages said safety power switch.

3. The multipurpose pulverizer of claim 1, wherein said at least one safety power switch comprises at least first and second safety power switches, said first and second safety power switches being disposed such that only said first safety power switch is engaged by said cover when said cover is engaged with said waste case, and when said waste case is mounted in said cutter case and when said cutter case is mounted in said outer case, said cover being engageable with said second safety power switch when said waste cutter cases are removed, and when said cover is engaged with said outer case, said multipurpose pulverizer further comprising rotational speed adjustment means in said body and operatively connected to said motor and to said safety power switches, said rotational speed adjustment means being operative to adjust rotational speed of said rotatable shaft when said second safety power switch is engaged by said cover.

4. The multipurpose pulverizer of claim 1, further comprising a centrifugal juicer case selectively engageable with said rotatable shaft for rotation therewith, said centrifugal juicer case being mountable in said central opening of said waste case upon removal of said rotatable juicer case therefrom, said centrifugal juicer case comprising an outer housing engageable with said rotatable shaft and having a substantially impermeable side wall and a permeable bottom wall providing communication to said cutter case, a centrifugal net mounted in said outer case of said centrifugal juicer case for rotation therewith, said centrifugal net having side walls with a plurality of slits therein for providing communication from said centrifugal net to portions of said outer housing surrounding said centrifugal net.

5. The multipurpose pulverizer of claim 1, wherein said cover includes an aperture, a press bar adjustably mounted to said aperture for projecting from said cover toward said body, said adjustable mounting of said press bar permitting said press bar to project selected distances toward said body in accordance with pulverizing actions carried out by said multipurpose pulverizer.

* * * * *